United States Patent
Kato et al.

(10) Patent No.: US 7,099,255 B2
(45) Date of Patent: Aug. 29, 2006

(54) ERROR COUNTING APPARATUS FOR COUNTING AN ERROR NUMBER OF A PRE-PIT SIGNAL IN AN OPTICAL DISC AND METHOD THEREFOR

(75) Inventors: Masahiro Kato, Saitama (JP); Naoharu Yanagawa, Saitama (JP); Tatsuhiro Yone, Saitama (JP); Yuko Muramatsu, Saitama (JP); Shinji Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 498 days.

(21) Appl. No.: 10/139,394

(22) Filed: May 7, 2002

(65) Prior Publication Data

US 2002/0172120 A1    Nov. 21, 2002

(30) Foreign Application Priority Data

May 17, 2001    (JP)    ............................ P2001-148533

(51) Int. Cl.
    *G11B 7/00*    (2006.01)

(52) U.S. Cl. ................................. 369/53.35; 369/59.25

(58) Field of Classification Search ............ 369/53.12, 369/53.13, 53.35, 53.41, 53.42, 59.31, 59.32, 369/59.23, 59.26, 59.27, 47.27
    See application file for complete search history.

(56) References Cited

U.S. PATENT DOCUMENTS

| | | | |
|---|---|---|---|
| 6,272,089 B1 * | 8/2001 | Kato ........................ | 369/53.41 |
| 6,519,214 B1 * | 2/2003 | Hikima .................... | 369/44.26 |
| 6,552,983 B1 * | 4/2003 | Yoshida et al. .......... | 369/53.12 |
| 6,594,215 B1 * | 7/2003 | Moriwaki ................ | 369/53.35 |

* cited by examiner

*Primary Examiner*—Brian E. Miller
*Assistant Examiner*—Peter Vincent Agustin
(74) *Attorney, Agent, or Firm*—Sughrue Mion, PLLC

(57) ABSTRACT

In an error counting apparatus and method, there are provided a reproducing section for reproducing the optical disc and a counter for counting the error number of the pre-pit signal based on an output of the reproducing section. When it is detected that the reproducing section come up to the reproduction of the emboss portion, a counting operation of the counter is started in response to this detection. When it is detected that the reproducing section has reproduced the optical disc in the predetermined interval after the counting operation is started, the counting operation of the counter is stopped in response to this detection.

15 Claims, 5 Drawing Sheets

ERROR COUNTING APPARATUS FOR COUNTING AN ERROR NUMBER OF A PRE-PIT SIGNAL IN AN OPTICAL DISC AND METHOD THEREFOR

BACKGROUND OF THE INVENTION

1. Field of the Invention

The present invention relates to an error counting apparatus and method for counting the error number of pre-pit signals in the recording area containing the emboss portion formed on the optical disc.

2. Description of the Related Art

In the prior art, the DVD-RW (Digital Versatile Disc-ReWritable) is known as an example of the optical disc. In this DVD-RW disc, the lead-in area is provided prior to the data area. The control data zone is provided in this lead-in area. This control data zone is constructed by 192 ECC (Error Correction Code) blocks that consist of 176 control data blocks and 16 servo blocks. In this control data block, the control data are recorded by the deep emboss pits (readable embosses), and such control data cannot be rewritten but can be read. In the servo block, the shallow emboss pits (unreadable embosses) are recorded so as to make the reading of the land pre-pit possible in the situation that the rewrite of the control data is inhibited, as described later. In this case, please see the description of patent application Ser. No. 2000-78102 filed on Mar. 21, 2000 by the applicant of this application to know the details.

Meanwhile, the land pre-pit (LPP) signal indicating the address, etc. on the disc is recorded on the land track. In this case, the land pre-pit signal is not recorded on the land tracks, which correspond to the above 176 control data blocks, because such land pre-pit signal prevents the reading of the control data whereas the land pre-pit signal is recorded on the land tracks, which correspond to the above 16 servo blocks, to acquire the address of the subsequent data area.

By the way, it is stipulated in the DVD-RW format to satisfy the error rate of less than 3% in detecting the land pre-pit signal in the 16 servo blocks. Therefore, the disc manufacturer has to measure the error rate in this unreadable emboss portion. In the prior art, it is decided whether or not the disc can satisfy such standard, by supplying the pre-pit error pulse signal (indicating the error number) and the ECC block pulse signal (indicating the block number), which are output from the pre-pit signal decoder, to the dedicated counters respectively, then reading simply the counted values of respective counters with the eye, and then calculating the error rate.

However, since not only the unreadable emboss portion is constructed by the 16 ECC blocks (servo blocks) and is very short in length but also the land pre-pit signal is not recorded on the preceding readable emboss portion, the pre-pit error pulse signal is always output from the pre-pit signal decoder during the period when the readable emboss portion is reproduced. Therefore, it is very difficult to count precisely the error number from the beginning of the unreadable emboss portion. Also, it is possible to detect the error by monitoring the RF signal as the reproduced output with the eye via the oscilloscope, etc. However, it is difficult to execute such monitoring in the disc manufacturing step since the high skill is required for such monitoring.

SUMMARY OF THE INVENTION

The present invention has been made in view of such circumstances, and it is an object of the present invention to provide an error counting apparatus and method that can count precisely the error number of the land pre-pit signal in the unreadable emboss portion.

In order to achieve the above object, first an error counting apparatus for counting an error number of a pre-pit signal in a recording area containing an emboss portion formed on an optical disc, comprises a reproducing section for reproducing the optical disc; a counter for counting the error number of the pre-pit signal based on an output of the reproducing section; an emboss portion detector for detecting that the reproducing section comes up to reproduction of the emboss portion; a count start controlling means for starting a counting operation of the counter in response to an output of the emboss portion detector; a predetermined interval detector for detecting that the reproducing section has reproduced the optical disc in a predetermined interval after the counting operation is started; and a count stop controlling means for stopping the counting operation of the counter in response to an output of the predetermined interval detector.

According to such error counting apparatus, the error number of the pre-pit signals in the recording area containing the emboss portion can be counted precisely.

Second, in the error counting apparatus of the present invention, the emboss portion detector detects an address contained in the output of the reproducing section to detect that the reproducing section comes up to the reproduction of the emboss portion.

According to such error counting apparatus, the emboss portion can be detected precisely, and thus the error number of the pre-pit signals in the recording area containing the emboss portion can be counted precisely.

Third, in the error counting apparatus of the present invention, in the error counting apparatus set forth in claim 1, the predetermined interval detector detects that the reproducing section has reproduced the optical disc in the predetermined interval, based on a count value of pulse signals output from a decoding means that executes a decoding process of the pre-pit signal based on the output of the reproducing section.

According to such error counting apparatus, the predetermined interval can be detected precisely, and thus the error number of the pre-pit signals in the recording area containing the emboss portion can be counted precisely.

Fourth, in the error counting apparatus set forth in any one of above first to third, the error counting apparatus of the present invention further comprises a displaying means for displaying an error rate of the pre-pit signal in the predetermined interval, based on a count value of the counter.

According to such error counting apparatus, the error number of the pre-pit signals in the recording area containing the emboss portion can be counted precisely, and thus the precise error rate can be displayed.

Fifth, an error counting method of the present invention of counting an error number of a pre-pit signal in a recording area containing an emboss portion formed on an optical disc, comprises the steps of providing a reproducing section for reproducing the optical disc and a counter for counting the error number of the pre-pit signal based on an output of the reproducing section; detecting that the reproducing section comes up to reproduction of the emboss portion; starting a counting operation of the counter in response to this detection; detecting that the reproducing section has reproduced the optical disc in a predetermined interval after the counting operation is started; and stopping the counting operation of the counter in response to this detection.

According to such error counting method, the error number of the pre-pit signals in the recording area containing the emboss portion can be counted precisely.

Sixth, in the error counting method of the present invention, in the error counting apparatus set forth in claim 5, a detection that the reproducing section comes up to the reproduction of the emboss portion is carried out by detecting an address contained in the output of the reproducing section.

According to such error counting method, the emboss portion can be detected precisely, and thus the error number of the pre-pit signals in the recording area containing the emboss portion can be counted precisely.

Seventh, in the error counting method of the present invention, in the error counting apparatus set forth in claim 5, a detection that the reproducing section has reproduced the optical disc in the predetermined interval is carried out based on a count value of pulse signals output from a decoding means that executes a decoding process of the pre-pit signal based on the output of the reproducing section.

According to such error counting method, the predetermined interval can be detected precisely, and thus the error number of the pre-pit signals in the recording area containing the emboss portion can be counted precisely.

Eighth, in the error counting method of the present invention, in the error counting method set forth in any one of above fifth to seventh, an error rate of the pre-pit signal in the predetermined interval is displayed further based on a count value of the counter subsequently to a stop of the counting operation of the counter.

According to such error counting method, the error number of the pre-pit signals in the recording area containing the emboss portion can be counted precisely, and thus the precise error rate can be displayed.

DETAILED DESCRIPTION OF THE PREFERRED EMBODIMENTS

An embodiment of the present invention will be explained in detail with reference to the drawings hereinafter.

Figure 1:
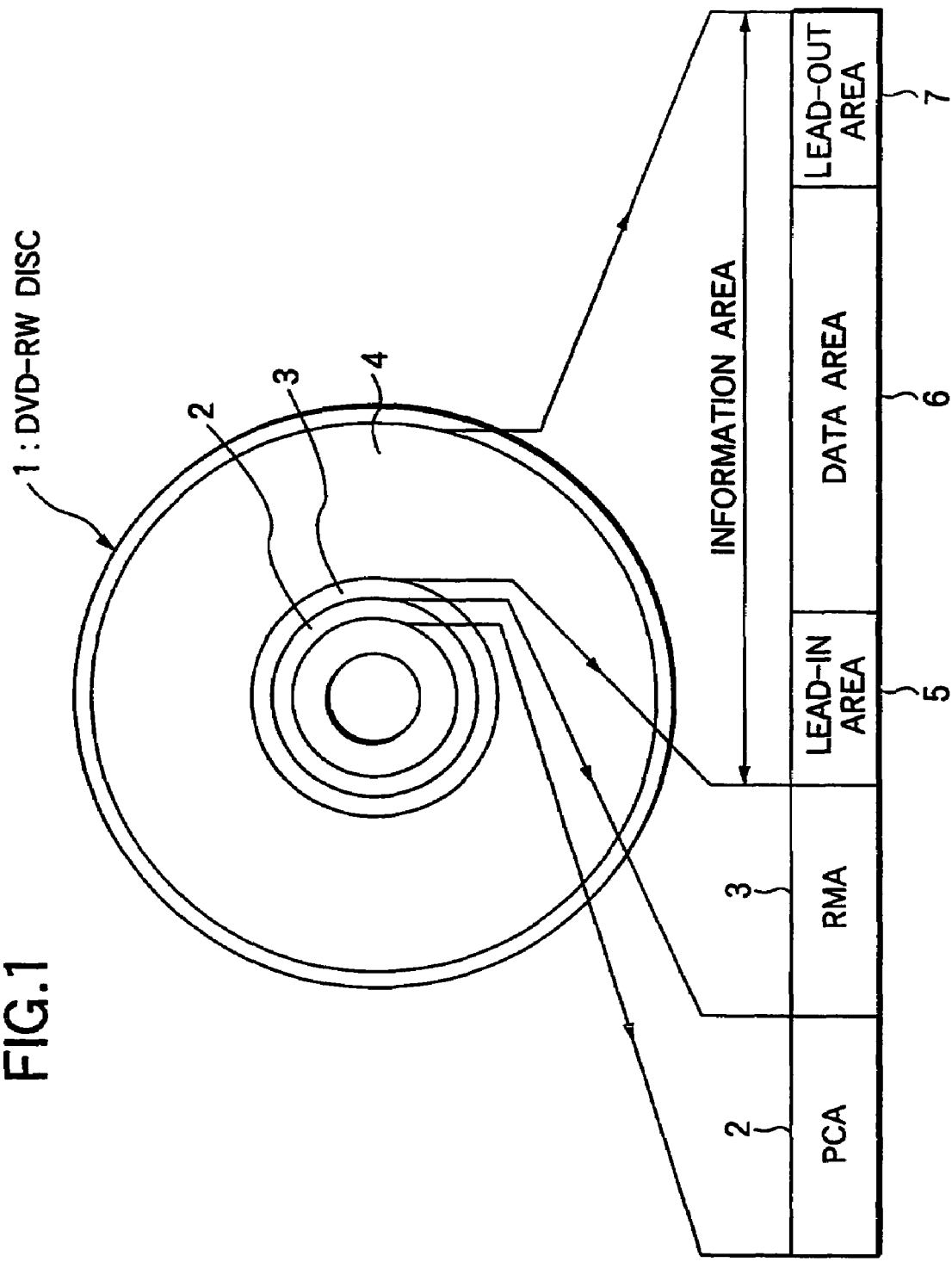
FIG. 1 is a view showing a recording format of a DVD-RW disc.

First, a recording format of the DVD-RW disc will be explained hereunder. In FIG. 1, a power calibration area (PCA) 2 for adjusting the laser power, a recording management area (RMA) 3 for recording the optimum laser power, etc., and an information area 4 for recording the information, etc. are provided sequentially to the DVD-RW disc 1 from the inner peripheral side to the outer peripheral side. The information area 4 consists of a lead-in area 5, a data area 6, and a lead-out area 7. In this case, the lead-out area 7 is formed on the outer peripheral side of the data area 6 to indicate the recording end position after the data area 6 is formed.

Figure 2:
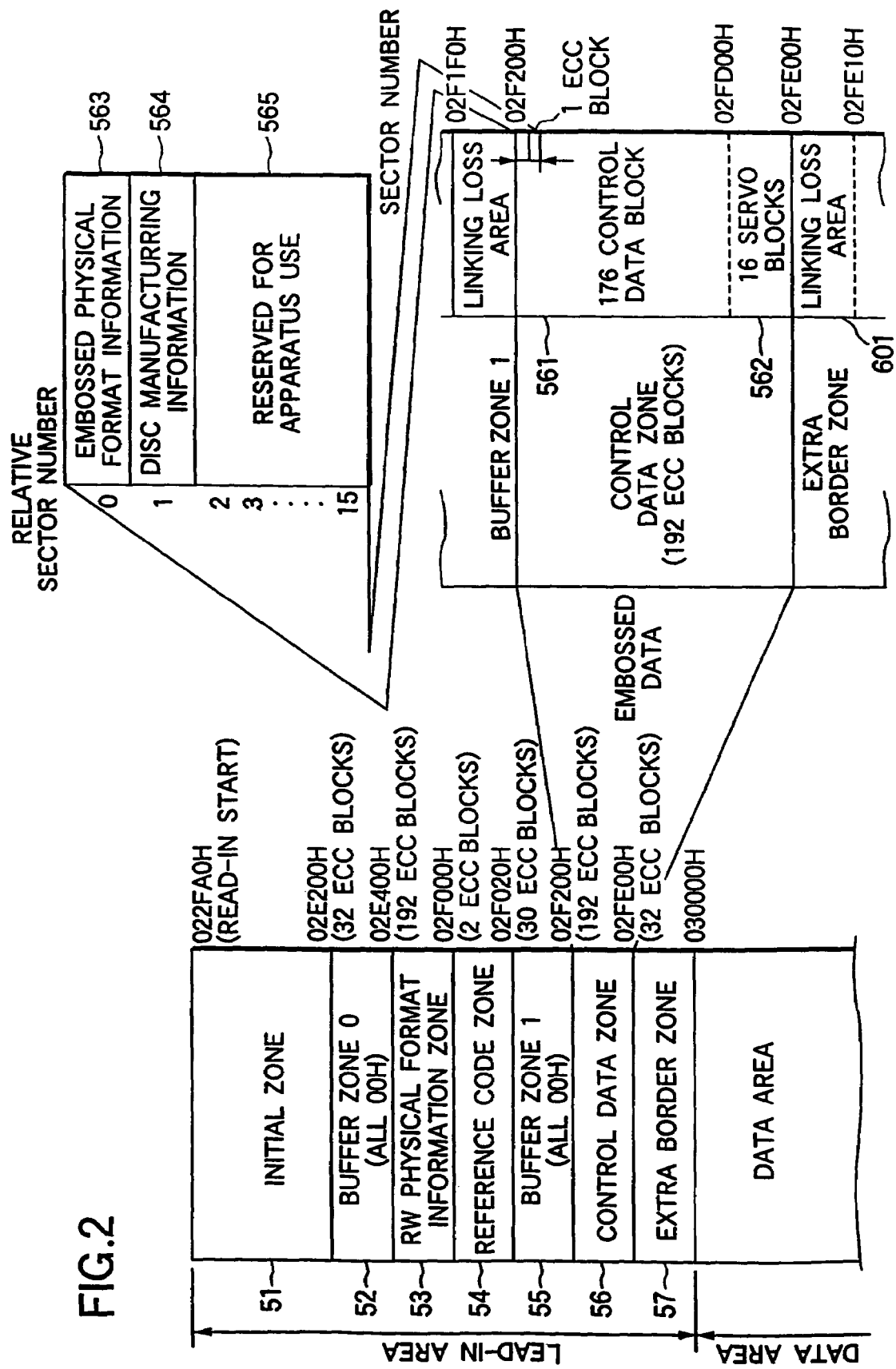
FIG. 2 is a view showing a detailed format of a lead-in area.

As shown in FIG. 2, the above lead-in area 5 consists of an initial zone 51, a buffer zone (0) 52, a RW physical format information zone 53, a reference code zone 54, a buffer zone (1) 55, a control data zone 56, and an extra border zone 57. In addition, the control data zone 56 is constructed by 192 ECC blocks that consist of 176 control data blocks 561 and 16 servo blocks 562. In the control data blocks 561, the control data constituting each ECC block is 176 times recorded repeatedly as the deep (almost 80 nm in depth) readable emboss to enable the reading. In the servo blocks 562, the unreadable emboss is recorded at the same depth (almost 20 to 30 nm in depth) as the groove track 14 (see FIG. 3), described later, to prevent the writing/reading of this zone.

While, the land pre-pit (LPP) signal indicating the address, etc. on the DVD-RW disc 1 is recorded on the land track. In this case, the land pre-pit signal is not recorded on the land tracks, which correspond to the above 176 control data blocks 561, because such land pre-pit signal prevents the reading of the control data whereas the land pre-pit signal is recorded on the land tracks, which correspond to the above 16 servo blocks 562, to acquire the address of the subsequent data area 6.

As shown in FIG. 2, each ECC block is constructed by an embossed physical format information 563, a disc manufacturing information 564, and a reserved-for-apparatus-use 565.

Figure 3:
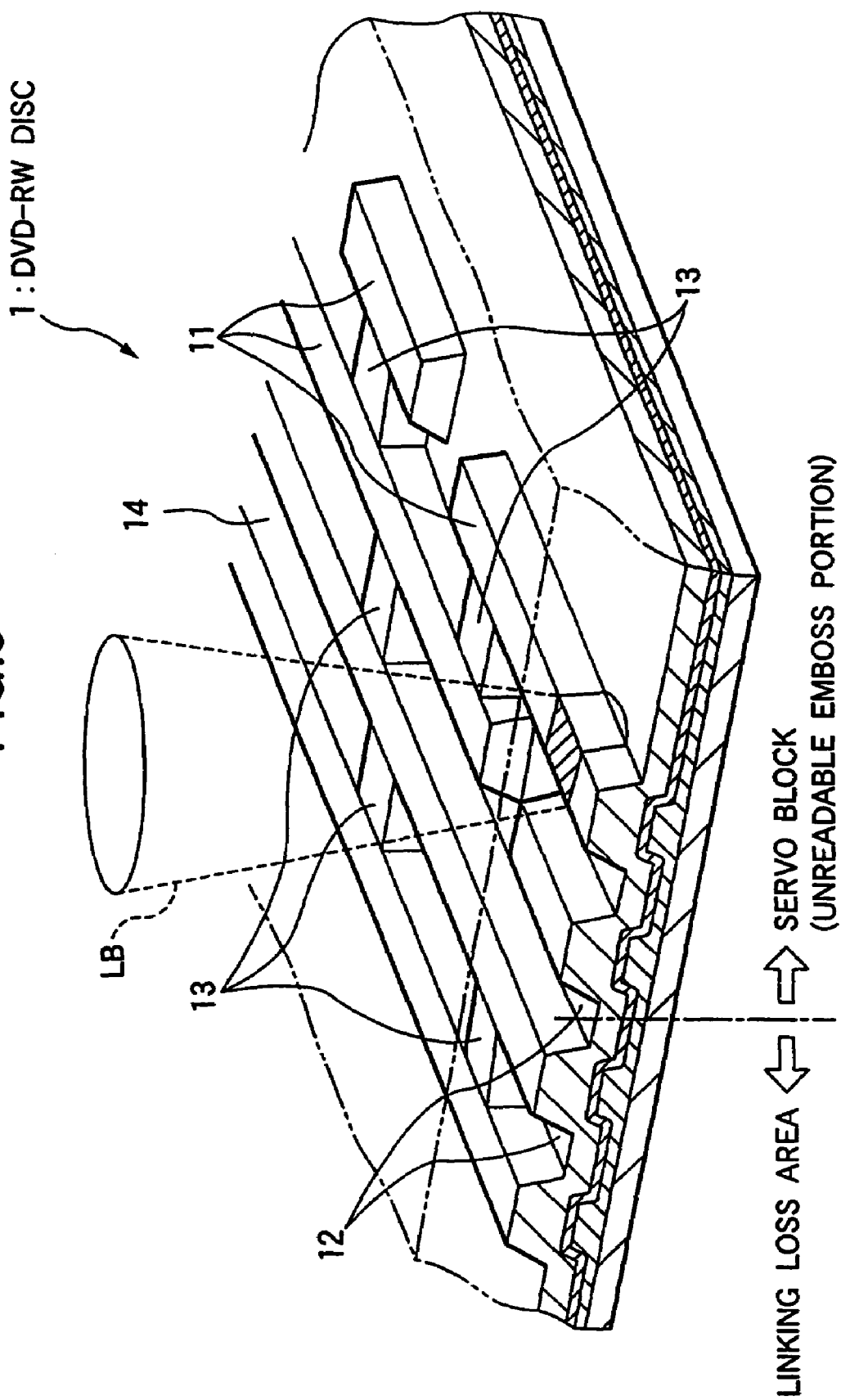
FIG. 3 is an enlarged view showing a structure of the DVD-RW disc near the border between 16 servo blocks (unreadable emboss portions) and subsequent linking cross areas.

FIG. 3 is an enlarged view showing a structure of the DVD-RW disc 1 in vicinity of the border between 16 servo blocks (unreadable emboss portions) 562 and subsequent linking loss areas 601 (see FIG. 2). In FIG. 3, as described above, in the servo block 562, unreadable embosses 11 are formed and also a land pre-pit 13 corresponding to the land pre-pit signal is formed on a land track 12. Meanwhile, in the linking loss area 601, groove tracks 14 are formed successively and also the land pre-pit 13 corresponding to the land pre-pit signal is formed on the land track 12.

Figure 4:
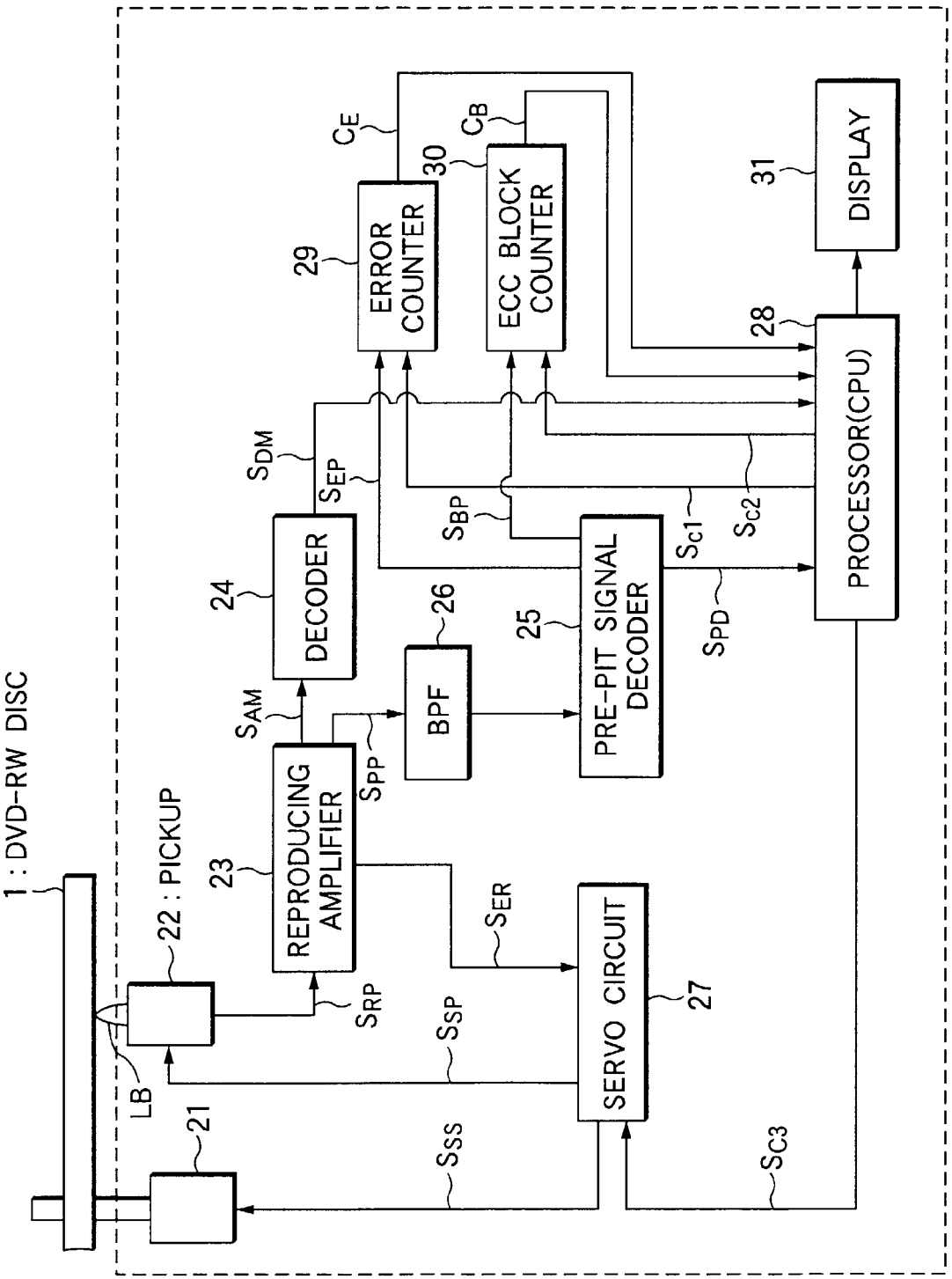
FIG. 4 is a block diagram showing a configuration of an error counting apparatus according to an embodiment of the present invention.

Next, a configuration of an error counting apparatus according to the embodiment of the present invention will be explained hereunder. In FIG. 4, a spindle motor 21 rotates/drives the DVD-RW disc 1 at a predetermined speed, and a pickup 22 reproduces the DVD-RW disc 1, which is rotated/driven by this spindle motor 21, by a laser beam LB (see FIG. 3) to output a reproduced signal $S_{RP}$ (see FIG. 3). The pickup 22 is connected to a reproducing amplifier 23. This reproducing amplifier 23 amplifies this reproduced signal $S_{RP}$ to output an amplified signal $S_{AM}$, and also generates a reproduced land pre-pit signal $S_{PP}$ and a focus/tracking error signal $S_{ER}$ based on the reproduced signal $S_{RP}$ to output them. This reproducing amplifier 23 is connected to a decoder 24 that applies the predetermined decoding process to the amplified signal $S_{AM}$ and outputs a decoded signal $S_{DM}$. Also, the reproducing amplifier 23 is connected to a pre-pit signal decoder 25 via a band-pass filter (BPF) 26. This pre-pit signal decoder 25 applies the predetermined decoding process to the reproduced land pre-pit signal $S_{PP}$ to output it as a decoded landpre-pit signal $S_{PD}$, and also generates a pre-pit error pulse signal $S_{EP}$ and an ECC block pulse signal $S_{BP}$ to output them. In more detail, when the pre-pit signal decoder 25 detects one error or more in the reproduced land pre-pit signal $S_{PP}$ contained in each ECC block, such decoder 25 outputs one pulse of the pre-pit error pulse signal $S_{EP}$ and also outputs one pulse of the ECC block pulse signal $S_{BP}$ every ECC block. In addition, the reproducing amplifier 23 is connected to a servo circuit 27. This servo circuit 27 generates a spindle servo control signal $S_{SS}$ based on the focus/tracking error signal $S_{ER}$ and a control signal $S_{C3}$ fed from a processor 28, described later, to supply it to the spindle motor 21, and also generates a pickup servo signal $S_{SP}$ to supply it to the pickup 22.

The decoder 24 is connected to the processor (CPU) 28 that receives the decoded signal $S_{DM}$, etc. to execute the operation control of the overall apparatus. While, the pre-pit signal decoder 25 is connected to the processor 28 and also is connected to an error counter 29 and an ECC block counter 30. The error counter 29 counts the pulse number of the pre-pit error pulse signal $S_{EP}$ based on a control signal $S_{C1}$ from the processor 28, and the ECC block counter 30 counts the pulse number of the ECC block pulse signal $S_{BP}$ based on a control signal $S_{C2}$ from the processor 28. The error counter 29 and the ECC block counter 30 are connected to the processor 28 to supply the count values $C_E$ and $C_B$ respectively. The processor 28 is connected to the servo circuit 27 that receives a control signal $S_{C3}$ from the processor 28 to operate, and also a display 31 that displays the error rate of the land pre-pit signal in the unreadable emboss portion. Such error rate of the land pre-pit signal is calculated by the processor 28 based on the count value $C_E$ of the error counter 29 and the count value $C_B$ of the ECC block counter 30.

Figure 5:
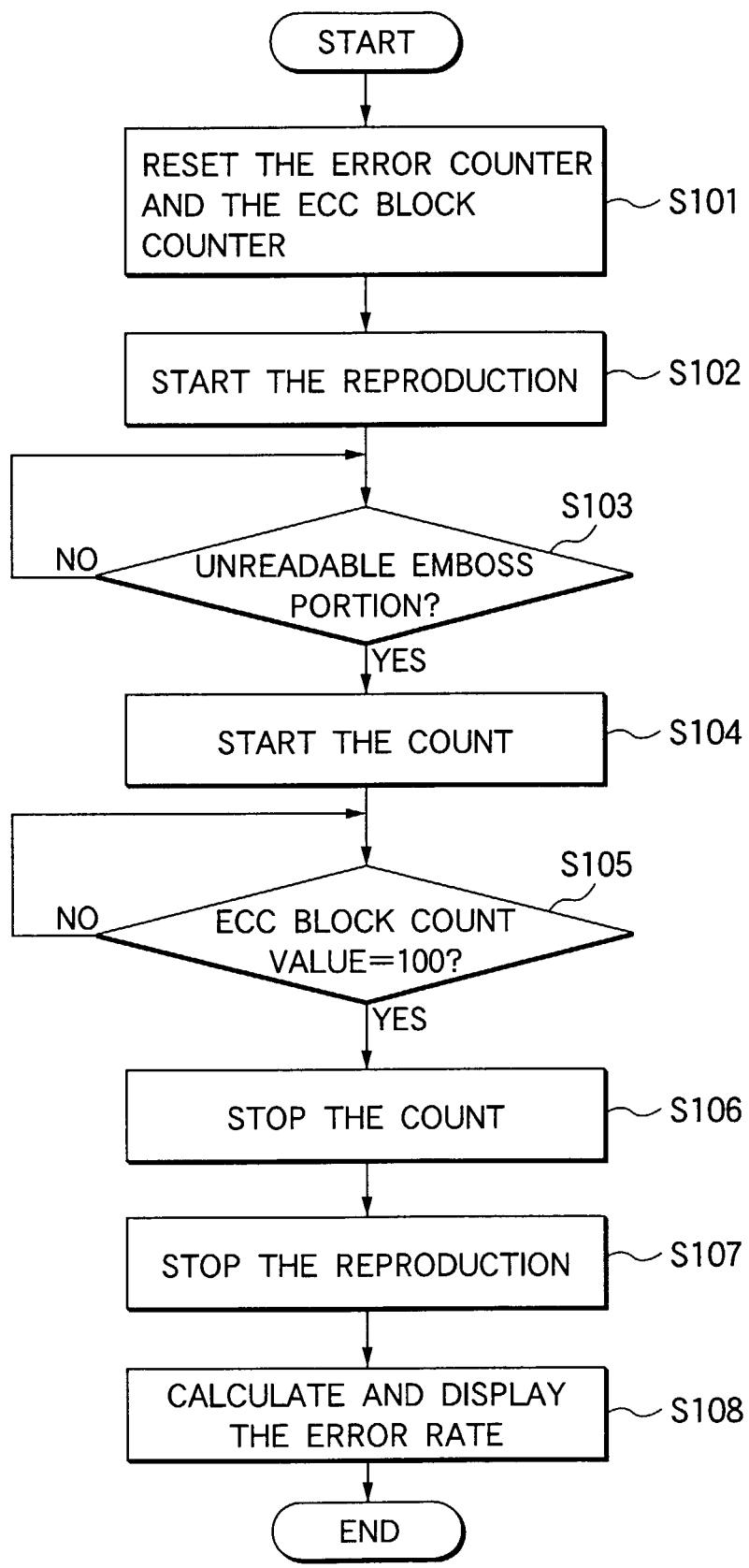
FIG. 5 is a flowchart explaining operation control by a processor in the error counting apparatus shown in FIG. 4.

The above processor 28 executes the operation control as shown in FIG. 5. More particularly, first the processor 28 resets the error counter 29 and the ECC block counter 30 respectively (step S101), and starts the reproducing operation of the DVD-RW disc 1 by the pickup 22, or the like (step S102). Then, the processor 28 monitors the address of the ECC block contained in the decoded signal $S_{DM}$ supplied from the decoder 24 and detects whether or not the pickup 22 comes up to the reproduction of the unreadable emboss portion (16 servo blocks) (step S103). Then, when the pickup 22 comes up to the reproduction of the unreadable emboss portion, the processor 28 causes the error counter 29 and the ECC block counter 30 to start the counting operation respectively (step S104). Then, after the counting operations are started, the processor 28 detects whether or not the DVD-RW disc 1 is reproduced in the predetermined interval, i.e., whether or not the count value $C_B$ of the ECC block counter 30 reaches the value [100], which is equivalent to 100 ECC blocks, in the present embodiment (step S105). Then, when the count value $C_B$ of the ECC block counter 30 becomes equal to the value [100], the processor 28 causes the error counter 29 and the ECC block counter 30 to stop the counting operation respectively (step S106) and then stops the reproducing operation of the DVD-RW disc 1 (step S107). Then, the processor 28 calculates the error rate of the land pre-pit signal in the unreadable emboss portion based on the count value $C_E$ of the error counter 29 and the count value $C_B$ of the ECC block counter 30, and then displays the error rate on the display 31 (step S108).

In this manner, in the error counting apparatus according to the present embodiment, after the reproduction of the DVD-RW disc 1 is started, the processor 28 detects that the pickup 22 comes up to the reproduction of the readable emboss portion which is equivalent to the 16 servo blocks, then causes the error counter 29 and the ECC block counter 30 to start respective counting operations in response to this detection, then detects that the DVD-RW disc 1 is reproduced in the predetermined interval, and then causes the error counter 29 and the ECC block counter 30 to stop respective counting operations in response to this detection.

As a result, the error number of the land pre-pit signals in the recording area containing the unreadable emboss portion can be counted precisely.

Also, in the present embodiment, it is detected whether or not the pickup comes up to the reproduction of the unreadable emboss portion, by monitoring the address of the ECC blocks contained in the decoded signal $S_{DM}$ supplied from the decoder 24. In this case, this detection may be carried out by monitoring the amplitude level of the amplified signal $S_{AM}$ or monitoring whether or not the land pre-pit signal is present.

In addition, in the present embodiment, when the count value $C_B$ of the ECC block counter 30 reaches [100], the counting operations of the error counter 29 and the ECC block counter 30 are stopped respectively. In this case, respective counting operations of the error counter 29 and the ECC block counter 30 may be stopped after the predetermined time, and then the error rate of the land pre-pit signal may be calculated based on the count value $C_E$ of the error counter 29 and the count value $C_B$ of the ECC block counter 30.

As apparent from the above explanation, according to the present invention, the error number of the pre-pit signals (land pre-pit signals) in the recording area containing the emboss portion (unreadable emboss portion) can be counted precisely.

What is claimed is:

1. An error counting apparatus for counting an error number of a pre-pit signal in a recording area containing an unreadable emboss portion formed on an optical disc, said apparatus comprising:
    a reproducing section adapted to reproduce the optical disc;
    a counter for counting the error number of the pre-pit signal based on an output of the reproducing section;
    an emboss portion detector for detecting that the reproducing section comes up to reproduction of the unreadable emboss portion;
    a count start controller for starting a counting operation of the counter in response to an output of the emboss portion detector;
    a predetermined interval detector for detecting that the reproducing section has reproduced the optical disc in a predetermined interval after the counting operation is started; and
    a count stop controller for stopping the counting operation of the counter in response to an output of the predetermined interval detector; and
    wherein the emboss portion detector detects the unreadable emboss portion based on a decoded signal of a readable emboss portion.

2. The error counting apparatus according to claim 1, wherein the emboss portion detector detects an address contained in the output of the reproducing section to detect that the reproducing section comes up to the reproduction of the unreadable emboss portion.

3. The error counting apparatus according to claim 2, wherein the address detected by the emboss portion detector is recorded on the emboss of the readable emboss portion.

4. The error counting apparatus according to claim 1, wherein the predetermined interval detector detects that the reproducing section has reproduced the optical disc in the predetermined interval, based on a count value of pulse signals output from a decoder that executes a decoding process of the pre-pit signal based on the output of the reproducing section.

5. The error counting apparatus according to claim 1, further comprising:
a display section adapted to display an error rate of the pre-pit signal in the predetermined interval, based on a count value of the counter.

6. An error counting method of counting an error number of a pre-pit signal in a recording area containing an unreadable emboss portion formed on an optical disc, said method comprising the steps of:
providing a reproducing section adapted to reproduce the optical disc and a counter for counting the error number of the pre-pit signal based on an output of the reproducing section;
detecting that the reproducing section comes up to reproduction of the unreadable emboss portion;
starting a counting operation of the counter in response to this detection;
detecting that the reproducing section has reproduced the optical disc in a predetermined interval after the counting operation is started; and
stopping the counting operation of the counter in response to this detection; and
wherein the emboss portion detector detects the unreadable emboss portion based on a decoded signal of a readable emboss portion.

7. The error counting method according to claim 6, wherein a detection that the reproducing section comes up to the reproduction of the unreadable emboss portion is carried out by detecting an address contained in the output of the reproducing section.

8. The error counting method according to claim 7, wherein the address detected by the detection is recorded on the emboss of the readable emboss portion.

9. The error counting method according to claim 6, wherein a detection that the reproducing section has reproduced the optical disc in the predetermined interval is carried out based on a count value of pulse signals output from a decoding means that executes a decoding process of the pre-pit signal based on the output of the reproducing section.

10. The error counting method according to claim 6, wherein an error rate of the pre-pit signal in the predetermined interval is displayed further based on a count value of the counter subsequently to a stop of the counting operation of the counter.

11. An apparatus for counting the number of errors in a pre-pit signal in a recording area containing an unreadable emboss portion formed on an optical disc, said apparatus comprising:
a reproducing circuit that reproduces the information from the optical disc;
a control circuit that detects when the reproducing circuit approaches the unreadable emboss portion;
wherein said control circuit begins counting the number of errors of the pre-pit signal when the reproduction circuit has approached the unreadable emboss portion; and
wherein the emboss portion detector detects the unreadable emboss portion based on a decoded signal of a readable emboss portion.

12. The apparatus according to claim 11, wherein the control circuit counts the number of errors in a predetermined area of the optical disk after the reproduction circuit has approached the unreadable emboss portion.

13. The apparatus according to claim 12, wherein the control circuit determines the predetermined area based on a count value of pulse signals output from a decoding circuit,
wherein said decoding circuit decodes the pre-pit signal based on an output of the reproducing circuit.

14. The error counting apparatus according to claim 12, further comprising:
a display adapted to display an error rate of the pre-pit signal in the predetermined area.

15. An error counting apparatus for counting an error number of a pre-pit signal in a recording area containing an unreadable emboss portion formed on an optical disc, said apparatus comprising:
a reproducing section adapted to reproduce the optical disc;
a counter for counting the error number of the pre-pit signal based on an output of the reproducing section;
an emboss portion detector for detecting that the reproducing section comes up to reproduction of the unreadable emboss portion;
a count start controller for starting a counting operation of the counter in response to an output of the emboss portion detector;
a predetermined interval detector for detecting that the reproducing section has reproduced the optical disc in a predetermined interval after the counting operation is started; and
a count stop controller for stopping the counting operation of the counter in response to an output of the predetermined interval detector; and
wherein the emboss portion detector detects an unreadable emboss portion based on amplitude levels of a decoded signal of a readable emboss portion and a decoded signal of the unreadable emboss portion.

* * * * *